(12) United States Patent
Awatsu et al.

(10) Patent No.: US 11,634,523 B2
(45) Date of Patent: Apr. 25, 2023

(54) (METH)ACRYLIC ACID ALKYL ESTER POLYMER AND USE THEREOF

(71) Applicant: Soken Chemical & Engineering Co., Ltd., Tokyo (JP)

(72) Inventors: Yasuhiro Awatsu, Sayama (JP); Naoki Shimada, Sayama (JP); Mitsuo Senoo, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 564 days.

(21) Appl. No.: 16/640,232

(22) PCT Filed: Aug. 23, 2018

(86) PCT No.: PCT/JP2018/031109
§ 371 (c)(1),
(2) Date: Feb. 19, 2020

(87) PCT Pub. No.: WO2019/039537
PCT Pub. Date: Feb. 28, 2019

(65) Prior Publication Data
US 2020/0362156 A1 Nov. 19, 2020

(30) Foreign Application Priority Data
Aug. 24, 2017 (JP) .............................. JP2017-161004

(51) Int. Cl.
*C08L 33/10* (2006.01)
*C08F 220/12* (2006.01)
*C08F 230/08* (2006.01)
*C09K 3/10* (2006.01)
*C08F 220/18* (2006.01)

(52) U.S. Cl.
CPC ...... *C08F 220/1804* (2020.02); *C08F 220/12* (2013.01); *C08F 230/085* (2020.02); *C08L 33/10* (2013.01); *C09K 3/10* (2013.01); *C08L 2312/08* (2013.01); *C09K 2200/0625* (2013.01); *C09K 2200/0685* (2013.01)

(58) Field of Classification Search
None
See application file for complete search history.

(56) References Cited

U.S. PATENT DOCUMENTS

| | | | |
|---|---|---|---|
| 4,478,990 A | 10/1984 | Kohno et al. | |
| 4,788,254 A | 11/1988 | Kawakubo et al. | |
| 4,981,937 A | 1/1991 | Kuriyama et al. | |
| 5,650,467 A | 7/1997 | Suzuki et al. | |
| 7,129,294 B2 | 10/2006 | Nakagawa et al. | |
| 8,680,184 B2 * | 3/2014 | Yano ....................... C09J 171/02 524/188 |
| 8,846,822 B2 * | 9/2014 | Yano ..................... C09D 171/02 525/407 |
| 8,981,011 B2 * | 3/2015 | Chae ................... H01L 31/0481 525/327.4 |
| 9,234,122 B2 | 1/2016 | Schümann et al. | |
| 2002/0137841 A1 | 9/2002 | Nakagawa et al. | |
| 2011/0098410 A1 | 4/2011 | Harumashi et al. | |
| 2013/0281632 A1 | 10/2013 | Yano et al. | |
| 2014/0309346 A1 | 10/2014 | Schümann et al. | |
| 2017/0107374 A1 | 4/2017 | Harumashi et al. | |
| 2017/0240676 A1 | 8/2017 | Kalgutkar et al. | |

FOREIGN PATENT DOCUMENTS

| | | |
|---|---|---|
| CN | 85106673 A | 3/1987 |
| CN | 103180395 A | 6/2013 |
| CN | 104099047 A | 10/2014 |
| CN | 106519235 A | 3/2017 |
| EP | 0217178 A2 | 4/1987 |
| JP | S50-156599 A | 12/1975 |
| JP | S57-179210 A | 11/1982 |
| JP | H7-258535 A | 10/1995 |
| JP | 2539485 B2 | 10/1996 |
| JP | H9-71749 A | 3/1997 |
| JP | 2004143411 A | 5/2004 |
| JP | 2004-292609 A | 10/2004 |
| JP | 2004292541 A | 10/2004 |
| JP | 2008001833 A | 1/2008 |
| JP | 4098890 B2 | 6/2008 |
| JP | 5355848 B2 * | 11/2013 |
| JP | 2015-25689 A | 2/2015 |
| JP | 5666904 B2 | 2/2015 |
| JP | 2016-509618 A | 3/2016 |

(Continued)

OTHER PUBLICATIONS

English abstractor JP 2006096888A, Apr. 13, 2006, Japan.*

(Continued)

*Primary Examiner* — Tae H Yoon
(74) *Attorney, Agent, or Firm* — The Webb Law Firm

(57) ABSTRACT

Provided are a novel acrylic polymer that has moderate crosslinking reactivity and is suitable for sealant applications and a sealant using the polymer. The (meth)acrylic acid alkyl ester polymer according to the invention has a weight average molecular weight (Mw) measured by gel permeation chromatography (GPC) method of 30,000 to 150,000 and a number average molecular weight (Mn) of less than 20,000 and has 1.1 to 3.0 methyldimethoxysilyl groups, more than 0.5 methyldimethoxysilyl groups at side chains of a molecular chain, and more than 0.5 methyldimethoxysilyl groups at molecular chain terminals, per one molecule of the polymer.

16 Claims, No Drawings

(56) References Cited

FOREIGN PATENT DOCUMENTS

WO     2014/024963 A1     2/2014
WO     2016/002907 A1     1/2016

OTHER PUBLICATIONS

Zhou, et al., "Synthesis and Properties of Poly( alkyl acrylate) -g -polydimethylsiloxane", Journal of Functional Polymers, 1998, pp. 370-374, vol. 11, No. 3, with English abstract.

Maruyama et al., "Study on Photopolymerization of Addition Products of Multi-Functional Acrylates and Alkoxysilyl Alkyl Thiol", Journal of Photopolymer Science and Technology, 2001, pp. 165-170, vol. 14, No. 2.

* cited by examiner

(METH)ACRYLIC ACID ALKYL ESTER POLYMER AND USE THEREOF

CROSS-REFERENCE TO RELATED APPLICATIONS

This application is the United States national phase of International Application No. PCT/JP2018/031109 filed Aug. 23, 2018, and claims priority to Japanese Patent Application No. 2017-161004 filed Aug. 24, 2017, the disclosures of which are hereby incorporated by reference in their entirety.

TECHNICAL FIELD

The present invention relates to novel acrylic polymers suitable for sealant applications and sealants using the polymers.

BACKGROUND ART

Sealants are used in large quantities mainly in the field of architecture, with their major types including modified silicone type, urethane type, and silicone type. In particular, modified silicone-type sealants account for the largest share of market production. Japanese Patent Laid-Open No. S50-156599 describes a modified silicone-type sealant as a resin with a polypropylene glycol (PPG) skeleton that has a reactive silyl group serving as a crosslinkable group at both terminals is widely used. However, such a sealant has a problem that the bond of C—O in the PPG skeleton is apt to be easily broken which leads to poor weather resistance.

As a technique capable of remedying the weather resistance problem, Japanese Patent No. 2539485 describes a resin composition that contains a polymer with a (meth) acrylic main chain which has a reactive silyl group at both terminals and contains an organometallic compound as a curing accelerator that is known as an adhesive composition.

It is also proposed that the introduction of a reactive silyl group at both terminals with high precision by ATRP method (atom transfer radical polymerization method) can further enhance characteristics such as elongation as described in Japanese Patent No. 4098890. However, since this method requires the use of a metal catalyst, a metal catalyst that cannot be purified remaining causes problems, such as inhibited crosslinking reaction and coloration, at the time a sealant composition is formed.

Accordingly, there has been desire for the development of polymers having moderate crosslinking reactivity and being suitable for use as a sealant and substantially free from metal components and desire for sealants using such polymers.

Under such circumstances, Japanese Patent No. 5355848 proposes a curable resin composition containing an acrylic polymer (A) having a crosslinkable hydrolyzable silyl group and an oxyalkylene polymer (B) having a crosslinkable hydrolyzable silyl group. Patent Document 4 teaches that the acrylic polymer (A) has 0.1 to 0.5 hydrolyzable silyl groups at side chains of a molecular chain thereby having curing characteristics and allowing cured products to exhibit good elongation.

It is an object of the invention to provide a novel acrylic polymer that has moderate crosslinking reactivity, is suitable for sealant applications, and preferably contains substantially no metal components and to provide a sealant using the polymer.

As a result of intensive investigation, the inventors have found that an acrylic polymer having a specific structure can provide a sealant exhibiting favorable properties in terms of elongation at break, residual tack and modulus performance even if the polymer does not have reactive silyl groups introduced by ATRP method at both terminals. Thereby, the present invention has been completed. Further, it has been found that such an acrylic polymer can be polymerized without using a metal catalyst and this can lead to remedying problems such as inhibited crosslinking reaction that would be caused by residues of the metal catalyst.

That is, the present invention relates to the following [1] to [6].

[1] A (meth)acrylic acid alkyl ester polymer that has a weight average molecular weight (Mw) measured by gel permeation chromatography (GPC) method of 30,000 to 150,000 and a number average molecular weight (Mn) of less than 20,000 and that has 1.1 to 3.0 methyldimethoxysilyl groups, more than 0.5 methyldimethoxysilyl groups at side chains of a molecular chain, and more than 0.5 methyldimethoxysilyl groups at molecular chain terminals, per one molecule of the polymer.

[2] The (meth)acrylic acid alkyl ester polymer according to [1] above, which has a structural unit derived from (meth)acrylic acid alkyl ester in which an alkyl group has 2 to 25 carbons.

[3] The (meth)acrylic acid alkyl ester polymer according to [1] or [2] above, wherein the molecular weight distribution (Mw/Mn), determined from a weight average molecular weight (Mw) and a number average molecular weight (Mn) measured by gel permeation chromatography (GPC method), is 1.8 or more.

[4] The (meth)acrylic acid alkyl ester polymer according to any one of [1] to [3] above, which contains substantially no metal components.

[5] The (meth)acrylic acid alkyl ester polymer according to any one of [1] to [4] above, which has no crosslinkable silyl groups other than methyldimethoxysilyl groups.

[6] A sealant comprising the (meth)acrylic acid alkyl ester polymer described in any one of [1] to [5] above.

The (meth)acrylic acid alkyl ester polymer of the invention can have moderate crosslinking reactivity, be suitable for sealant applications, and usually contain substantially no metal components. Further, the (meth)acrylic acid alkyl ester polymer of the invention has a wide molecular weight distribution and a relatively low viscosity thereby being excellent in handleability and mixing with other resins, contains substantially no metal components thereby being unlikely to cause problems such as inhibited crosslinking reaction, coloration and discoloration, and has moderate crosslinking reactivity thereby having a sufficient pot life when used as a crosslinking composition such as a sealant.

The sealant of the invention has good workability and sufficient pot life, is excellent in properties after curing such as elongation at break, residual tack and modulus performance, and exhibits good sealing performance.

DETAILED DESCRIPTION OF EMBODIMENTS OF THE INVENTION

The present invention will be specifically described below.

(Meth)acrylic Acid Alkyl Ester Polymer

The (meth)acrylic acid alkyl ester polymer of the invention has a weight average molecular weight (Mw) of 30,000 to 150,000 and a number average molecular weight (Mn) of less than 20,000, and has an average of 1.1 to 3.0 crosslinkable silyl groups per one molecule of the polymer. The (meth)acrylic acid alkyl ester polymer of the invention is a polymer in which the number of crosslinkable silyl groups at side chains of a molecular chain exceeds 0.5 per one molecule of the polymer and the number of crosslinkable silyl groups at molecular chain terminals exceeds 0.5 per one molecule of the polymer.

In the present invention, (meth)acrylic means acrylic or methacrylic, and (meth)acrylate means acrylate or methacrylate.

The (meth)acrylic acid alkyl ester polymer of the invention is a polymer having a structure derived from (meth) acrylic acid alkyl ester. The (meth)acrylic acid alkyl ester polymer contains, in the main chain of the polymer, a structural unit derived from (meth)acrylic acid alkyl ester in an amount of usually 50 wt % or more, preferably 90 wt % or more, more preferably 95 wt % or more, and still preferably 98 wt % or more. When the structural unit derived from (meth)acrylic acid alkyl ester represents less than 50 wt % in the polymer, weather resistance and the like may be reduced.

The (meth)acrylic acid alkyl ester is a (meth)acrylic acid alkyl ester in which an alkyl group of an alkyl ester has usually 1 to 30 carbons, preferably 2 to 25 carbons, more preferably 3 to 18 carbons, and even more preferably 4 to 12 carbons. Examples thereof include methyl (meth)acrylate, ethyl (meth)acrylate, propyl (meth)acrylate, n-butyl (meth) acrylate, tert-butyl (meth)acrylate, cyclohexyl (meth)acrylate, 2-ethylhexyl (meth)acrylate, n-octyl (meth)acrylate, isooctyl (meth)acrylate, isononyl (meth)acrylate, lauryl (meth)acrylate, myristyl (meth)acrylate, isomyristyl (meth) acrylate, cetyl (meth)acrylate, stearyl (meth)acrylate, and isobornyl (meth)acrylate.

The (meth)acrylic acid alkyl ester polymer of the invention has a number average of 1.1 to 3.0, preferably 1.1 to 2.5, and more preferably 1.1 to 2.0 methyldimethoxysilyl groups per one molecule of the polymer. The number of methyldimethoxysilyl groups per one molecule of the polymer is the total amount of the number of methyldimethoxysilyl groups at side chains of a molecular chain and the number of methyldimethoxysilyl groups at molecular chain terminals of the polymer. The (meth)acrylic acid alkyl ester polymer of the invention is not particularly limited, but it is preferable that the total amount of crosslinkable silyl groups containing the methyldimethoxysilyl groups satisfies the range of 1.1 to 3.0 in number average per one molecule of the polymer, and it is more preferable that the polymer has no crosslinkable silyl groups other than the methyldimethoxysilyl groups.

The (meth)acrylic acid alkyl ester polymer of the invention has methyldimethoxysilyl groups both at side chains of a molecular chain and at molecular chain terminals. The number of methyldimethoxysilyl groups at side chains of a molecular chain exceeds 0.5 in number average per one molecule of the polymer, and the number of methyldimethoxysilyl groups at molecular chain terminals exceeds 0.5 in number average per one molecule of the polymer. The number of methyldimethoxysilyl groups at side chains of a molecular chain is usually more than 0.5 to less than 2.5, and preferably in the range from 0.55 to 1.5 in number average per one molecule of the polymer. The number of methyldimethoxysilyl groups at molecular chain terminals is usually more than 0.5 to less than 2.5, preferably in the range of 0.55 to 1.5, in number average per one molecule of the polymer.

The number of methyldimethoxysilyl groups can be calculated by theoretically calculating the number of reactive silyl group-containing monomers per one molecule of the polymer from the compositional ratio and the number average molecular weight (Mn).

The (meth)acrylic acid alkyl ester polymer of the invention having the methyldimethoxysilyl groups in such amounts leads to easily preparing a crosslinkable composition having moderate crosslinkability, being suitable for applications involving the formation of crosslinked products and having an appropriate pot life. Use of the (meth)acrylic acid alkyl ester polymer in crosslinkable applications such as sealant applications and adhesive applications is preferable because of attaining excellent handleability and facilitated workability.

In respect of the (meth)acrylic acid alkyl ester polymer of the invention, the methyldimethoxysilyl groups at side chains of a molecular chain and the methyldimethoxysilyl groups at molecular chain terminals may be introduced into the polymer in any manner, but can be introduced usually by copolymerizing a monomer having a methyldimethoxysilyl group with a (meth)acrylic acid alkyl ester.

In respect of the methyldimethoxysilyl groups at side chains of a molecular chain, the use may be made of, for example, a (meth)acryloxyalkylmethyldimethoxysilane with its alkyl group having usually 1 to 30, preferably 2 to 10, more preferably 2 to 5 carbons for the introduction. Specific examples thereof include 3-methacryloxypropylmethyldimethoxysilane, 3-acryloxypropylmethyldimethoxysilane, 3-methacryloxybutylmethyldimethoxysilane, and 3-acryloxybutyldimethoxysilane.

In respect of the methyldimethoxysilyl group at molecular chain terminals, the use may be made of a 3-mercaptoalkylmethyldimethoxysilane with its alkyl group having usually 1 to 30 carbons, preferably 2 to 10 carbons, more preferably to 5 carbons. Specific examples thereof include 3-mercaptopropylmethyldimethoxysilane and 3-mercaptobutylmethyldimethoxysilane. In view of the fact that a 3-mercaptoalkylmethyldimethoxysilane has a functional group exhibiting high chain transferability, thus acting as a chain transfer agent, its polymerization together with a (meth)acrylic alkyl ester or the like enables methyldimethoxysilane to be introduced into the molecular chain terminals. Use of a 3-mercaptoalkylmethyldimethoxysilane in an amount of preferably 0.4 to 2.0 parts by weight, more preferably 0.5 to 1.5 parts by weight, based on the total amount of 100 parts by weight of the (meth)acrylic acid alkyl ester and the other monomers leads to suitably producing the (meth)acrylic acid alkyl ester polymer having more than 0.5 methyldimethoxysilyl groups at molecular chain terminals with the number of methyldimethoxysilyl groups per one molecule of the polymer satisfying the range of 1.1 to 3.0.

The (meth)acrylic acid alkyl ester polymer of the invention may contain structural units derived from other copolymerizable monomers without impairing the object of the invention, or may contain structural units derived from (meth)acrylic esters other than the (meth)acrylic acid alkyl ester. It is desirable that the content of the structural units derived from such other monomers is 10 wt % or less, preferably 5 wt % or less, of the total structural units constituting the polymer.

Such other copolymerizable monomers include styrene derivatives such as styrene, indene, α-methylstyrene, p-methylstyrene, p-chlorostyrene, p-chloromethylstyrene, p-methoxystyrene, p-tert-butoxystyrene, and divinylbenzene; compounds having a vinyl ester group such as vinyl acetate, vinyl propionate, vinyl butyrate, vinyl caproate, vinyl benzoate, and vinyl cinnamate; compounds having a vinyloxy group such as maleic anhydride, N-vinylpyrrolidone, N-vinylmorpholine, (meth)acrylonitrile, (meth)acrylamide, N-cyclohexylmaleimide, N-phenylmaleimide, N-laurylmaleimide, N-benzylmaleimide, n-propylvinyl ether, n-butylvinyl ether, isobutylvinyl ether, tert-butylvinyl ether, tert-amylvinyl ether, cyclohexylvinyl ether, 2-ethylhexylvinyl ether, dodecylvinyl ether, octadecylvinyl ether, 2-chloroethylvinyl ether, ethylene glycol butylvinyl ether, triethylene glycol methylvinyl ether, (4-vinyloxy)butyl benzoate, ethylene glycol divinyl ether, diethylene glycol divinyl ether, triethylene glycol divinyl ether, tetraethylene glycol divinyl ether, butane-1,4-diol-divinyl ether, hexane-1,6-diol-divinyl ether, cyclohexane-1,4-dimethanol-divinyl ether, di(4-vinyloxy)butyl isophthalate, di(4-vinyloxy)butyl glutarate, succinic acid di(4-vinyloxy)butyltrimethylol propanetrivinyl ether, 2-hydroxyethylvinyl ether, 4-hydroxybutylvinyl ether, 6-hydroxyhexylvinyl ether, cyclohexane-1,4-dimethanol-monovinyl ether, diethylene glycol monovinyl ether, 3-aminopropylvinyl ether, 2-(N,N-diethylamino)ethylvinyl ether, urethane vinyl ether, and polyester vinyl ether; polyalkylene glycol (meth)acrylates such as methoxy polyethylene glycol (meth)acrylate, epoxypolyethylene glycol (meth)acrylate, octoxypolyethylene glycol (meth)acrylate, lauroxypolyethylene glycol (meth)acrylate, stearoxy-polyethylene glycol-(meth)acrylate, polyethylene glycol mono(meth)acrylate, and polypropylene glycol mono(meth)acrylate; (meth)acrylic acid hydroxy compounds such as 2-hydroxyethyl (meth)acrylate, 2-hydroxypropyl (meth)acrylate, and 4-hydroxybutyl (meth)acrylate; dialkylamino alkyl(meth)acrylates such as 2-dimethylaminoethyl (meth) acrylate; and (meth)acrylate compounds and (meth)acrylic acid that have another functional group.

The weight average molecular weight (Mw) of the (meth) acrylic acid alkyl ester polymer of the invention is usually in the range of 30,000 to 150,000, preferably 31,000 to 100,000, and more preferably 32,000 to 75,000. When the weight average molecular weight (Mw) satisfies the range of 30,000 to 150,000, the (meth)acrylic acid alkyl ester polymer has a moderate viscosity of usually 500 Pa·s or less, and can be suitably used for sealant applications and the like. When the weight average molecular weight (Mw) satisfies the range of 31,000 to 100,000, preferably 32,000 to 75,000, the (meth) acrylic acid alkyl ester polymer has a further moderate viscosity of 400 Pa·s or less thereby being excellent in handleability and mixing with other resins, which is therefore preferable.

The number average molecular weight (Mn) of the (meth) acrylic acid alkyl ester polymer of the invention is usually less than 20,000, and preferably less than 19,000. The number average molecular weight (Mn) is not particularly limited, but is preferably 2,500 or more. The number average molecular weight satisfying such conditions is preferable from the viewpoint of excellent handleability and mixing with other resins.

The (meth)acrylic acid alkyl ester polymer of the invention preferably has a molecular weight distribution (Mw/Mn), determined from a weight average molecular weight (Mw) and a number average molecular weight (Mn), in the range of preferably 1.8 or more, more preferably 2.0 or more, and still more preferably 2.1 or more. The molecular weight distribution (Mw/Mn) is preferably 3.2 or less, which is not particularly limited thereto. The (meth)acrylic acid alkyl ester polymer having a molecular weight distribution in such a range has a relatively wide molecular weight distribution thereby to have moderate fluidity thereby being suitable for sealant applications and the like, which is therefore preferable.

In the present invention, the weight average molecular weight (Mw) and the number average molecular weight (Mn) refer to values measured by gel permeation chromatography method (GPC method), with their measurements being carried out by a method described in the following Examples.

The viscosity of the (meth)acrylic acid alkyl ester polymer of the invention is not particularly limited, but is preferably in the range of 500 Pa·s or less, more preferably 400 Pa·s or less, and still more preferably 10 to 400 Pa·s, which are ranges suitable for sealant applications.

A method for producing the (meth)acrylic acid alkyl ester polymer of the invention may be any of the above-described methods capable of polymerizing the monomer components, but it is preferable that a metal catalyst is not used; the polymerization is preferably carried out by a polymerization method using an azo compound polymerization initiator or a peroxide polymerization initiator as a polymerization initiator, and the polymerization is more preferably carried out by a polymerization method using an azo compound polymerization initiator. The (meth)acrylic acid alkyl ester polymer produced by such a method is preferable because of having a relatively wide molecular weight distribution to have moderate fluidity thereby being excellent workability when applied to sealants, etc., contains no metal components derived from a catalyst in the polymer thereby remedying problems such as inhibited crosslinking reaction and coloration, and has a pot life suitable for use in crosslinking applications such as sealants.

Examples of the azo compound polymerization initiators include 2,2'-azobisisobutyronitrile, 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobis(2-methylbutyronitrile), 1,1'-azobis(cyclohexane-1-carbonitrile), 2-(carbamoylazo)isobutyronitrile, 2-phenolazo-4-methoxy-2,4-dimethylvaleronitrile, 2,2'-azobis(2-amidinopropane)dihydrochloride, 2,2'-azobis(N,N'-dimethyleneisobutylamidine), 2,2'-azobis[2-methyl-N-(2-hydroxyethyl)-propioneamide], 2,2'-azobis(isobutylamide) dihydrate, 4,4'-azobis(4-cyanopentanoic acid), 2,2'-azobis(2-cyanopropanol), dimethyl-2,2'-azobis(2-methylpropionate), and 2,2'-azobis[2-methyl-N-(2-hydroxyethyl)propioneamide].

Examples of the peroxide polymerization initiators include benzoyl peroxide and laurium peroxide.

These polymerization initiators may be used alone or in combination of two or more. It is also preferable that the polymerization initiator is sequentially added a plurality of times.

The amount of the polymerization initiator used is usually 0.001 to 2 parts by mass, preferably 0.002 to 1 part by mass, per 100 parts by mass of the monomers. By using the polymerization initiator within the above range, the weight average molecular weight of the (meth)acrylic acid alkyl ester polymer can be adjusted to be within an appropriate range.

The (meth)acrylic acid alkyl ester polymer of the invention preferably contains substantially no metal components. Specifically, the fact that the (meth)acrylic acid alkyl ester polymer substantially contains no metal components means that metal components in the (meth)acrylic acid alkyl ester polymer represent less than 100 ppm. The content is detected by a method described in Examples.

Applications of (Meth)acrylic Acid Alkyl Ester Polymer

The (meth)acrylic acid alkyl ester polymer of the invention has a good crosslinkability, and therefore can be used in e.g., applications involving curing by crosslinking, applications utilizing the elasticity of cured products, and applications utilizing the fact that the polymer is a viscous liquid.

Examples of the applications include sealants, adhesives, bonding agents, vehicles for paints, primer resins, binders for ink, coating resins for covering surfaces of inorganic materials such as cement, mortar, metals and glass, sheet articles (e.g., ventilation sheets, protective sheets, water-shielding sheets, damping sheets, transfer sheets, dimming sheets, antistatic sheets, conductive sheets, curing sheets, sound insulation sheets, light-shielding sheets, decorative sheets, marking sheets and flame retardant sheets), film articles (e.g., marking films, protective films, ink fixing films, laminate films), foams (including rigid foams, flexible foams, semi-rigid foams and flame-retardant foams), reactive plasticizers, plasticizers, diluents, compatibilizers, polymeric silane coupling agents, silica coating agents, grafting agents and blocking agents for silicone resins, as intermediate raw materials, raw materials of modification resins as e.g., modifiers of silicone rubbers, raw materials for resins or raw materials for modification for various block polymers, as macromers, and additives. Further examples of the applications include fiber modifiers, fiber surface treatment agents, paper processing agents, paper modifying agents, surface active agents, dispersion stabilizers, dispersion mediums, solvents, viscosity regulators, adsorbents, hair processing agents, additives for toners, electric charge controlling agents, antistatic agents, low-shrinkage agents, antifogging agents, antifouling agents, hydrophilizing agents, lipophilicity imparting agents, pharmaceutical carriers, pesticide carriers, cosmetic compounding agents, lubricants, additives for polymer alloys, gel coating agents, resins for FRP, additives for FRP resins, resins for artificial marble, resin additives for artificial marble, resins for injection-molded products, raw materials for UV and EV curable resins, tackifiers, various binders (e.g., binders for magnetic recording media, binders for casting, binders for calcined products, binders for glass fiber sizing materials), urethane modifiers for RIM, resins for laminated glass, damping materials, sound-insulating materials, resins for separation membranes, soundproofing materials, sound-absorbing materials, artificial leather, artificial skin, synthetic leather, various industrial parts, daily necessities, articles for toiletry, acrylic silicone rubbers, acrylic silicone rubber modifiers, acrylic silicone foam modifiers, silicone rubber modifiers, silicone foam plasticizers, silicone foam modifiers, and acrylic rubber modifiers.

The (meth)acrylic acid alkyl ester polymer of the invention has moderate crosslinkability and, when used as a sealant, etc., is free from problems that would be caused by residual metal catalysts, and is excellent in handling, which is therefore preferable.

Sealant

The sealant of the invention contains the above-mentioned (meth)acrylic acid alkyl ester polymer of the invention. Since the sealant of the invention contains the (meth)acrylic acid alkyl ester polymer having a relatively wide molecular weight distribution, the sealant has good compatibility with other resins and additives and has low viscosity as a sealant, so that the sealant is excellent in handleability.

It is also preferable that the sealant of the invention contains, in addition to the above-mentioned (meth)acrylic acid alkyl ester polymer, a polymer different therefrom. Such different polymers that may be contained in the sealant include, but are not particularly limited to, oxyalkylene polymers having a crosslinkable silyl group.

The sealant of the invention may also contain, as needed, a catalyst and a cocatalyst for adjusting its curing characteristics, a dehydrant, a filler, a sagging-preventive agent, a pigment, an antioxidant and the like.

The sealant of the invention described above has good pot life and is excellent in workability and in elongation at break and modulus after curing.

EXAMPLES

Hereinafter, the present invention will be described more specifically based on examples, but the present invention is not limited to these examples.

In the following Examples and Comparative Examples, parts represent parts by weight.

Evaluation Method

In the following Examples and Comparative Examples, measurements and evaluations of properties and characteristics of polymers were carried out by methods indicated below.

Evaluation of Polymer

Molecular Weight

In respect of a weight average molecular weight (Mw) and a number average molecular weight (Mn) of a copolymer, analysis by gel permeation chromatography (GPC) method followed by calculation on the basis of polystyrene under the following conditions was performed.

Apparatus: GPC-8220 (manufactured by Tosoh Corporation)
Column: G7000 HXL/7.8 mm ID×1+GMHXL/7.8 mm ID×2+G2500 HXL/7.8 mm ID×1
Medium: Tetrahydrofuran
Flow rate: 1.0 mL/min
Concentration: 1.5 mg/ml
Injection volume: 300 μL
Column temperature: 40° C.

Gel Fraction

Approximately 1 g of a sample was weighed out, immersed in ethyl acetate for 24 hours, and thereafter shaken for 2 hours with a shaker (SA 300, Yamato Scientific Co., Ltd.). Solvent-insoluble matters were filtered through an SUS mesh #200. The collected solvent-insoluble matters were dried at 80° C. for 1 hour. The change in weight before and after the solvent-immersion was calculated as a percentage.

Number of Silyl Group

The number of reactive silyl group-containing monomers per one molecule of the polymer was theoretically calculated from the compositional ratio and the number average molecular weight (Mn) to determine an average number of silyl groups at side chains per one molecule of the polymer and an average number of silyl groups at terminals per one molecule of the polymer.

Viscosity

Measurement was made using a B-type viscometer (DV-II+Pro, Brookfield) at a liquid temperature of 25° C.

Evaluation of Properties of Mixture Liquid

Preparation Conditions of Mixture Liquid for Property Evaluation 100 parts by weight of a copolymer, 0.5 parts by weight of dibutyltin dilaurate (NEOSTANN U-100, Nitto Chemical Industry Co., Ltd.) as a catalyst, 5 parts by weight of γ-(2-aminoethyl)aminopropyltrimethoxysilane (Silquest A-1120, Momentive Performance Materials Inc.) as a cocatalyst, and 1 part by weight of vinyltrimethoxysilane (Silquest A-171, Momentive Performance Materials Inc.) as a dehydrant were weighed out in a glass bottle, and were preliminarily mixed with a spatula and then mixed with a rotation/revolution mixer (ARE-310, THINKY CORPORATION) for 2000 rpm×5 minutes to prepare a mixture liquid (I).

Pot Life

The mixture liquid (I) was allowed to stand still at 23° C. under 50% RH.

The case where it took 5 hours or more before the mixture liquid (I) had a two-fold viscosity was evaluated as AA; and the case where it took less than 5 hours before the mixture liquid (I) had a two-fold viscosity was evaluated as CC.

Elongation at Break

A test piece was obtained by curing the mixture liquid (I) at 23° C. under 50% RH for 7 days so that the thickness after curing was 2 mm.

The test piece was punched out into a No. 3 dumbbell mold, and the resultant test piece was stretched at a tensile speed of 100 mm/min until its fracture with the use of Autograph (AG-X, Shimadzu Corporation). The distance until the fracture was caused was determined, and an elongation from a length of the test piece was expressed as a percentage. The elongation at break is an index of toughness, and the higher the elongation at break, the better.

Evaluation of Properties of Cured Products

Modulus

The mixture liquid (I) was made into a sheet test piece having a thickness of 6 mm, which was cured at 23° C. under 50% RH for 7 days.

Measurement was made using a rubber hardness tester (JIS K 6253 Type A, KOBUNSHI KEIKI CO., LTD.). Note that a low modulus indicates a poor restorability and a high modulus indicates a decreased elongation at break.

Residual Tack

The mixture liquid (I) was made into a sheet test piece having a thickness of 2 mm. A sample obtained through its curing at 23° C. under 50% RH for 7 days was evaluated by a sensory test based on finger touch.

Where the feeling of stickiness at the time of touching was strong and stickiness markedly remained on the finger after the touching, this case was marked as CC; where there was a little stickiness and a little stickiness remained on the finger, this case was marked as BB; and where there was no stickiness felt and no stickiness remained on the finger, this case was marked as AA. Where the test piece failed to cure, this case was referred to as Not-cured.

Metal Content

Metal residues of the polymer were measured using an ICP emission spectrophotometer (ICPE-9000, Shimadzu Corporation).

With the detection limit being 2 ppm, the case where metal residues were detected was marked as AA, and the case where the metal residues were below the detection limit was marked as CC.

Example 1

Production and Evaluation of Copolymer A1

A flask equipped with a stirrer, a nitrogen gas introduction tube, a thermometer and a reflux condenser was charged with 50 parts of methyl ethyl ketone, 49.43 parts of n-butyl acrylate, 49.43 parts of 2-ethylhexyl acrylate and 1.15 parts of 3-methacryloxypropylmethyldimethoxysilane (KBM-502, Shin-Etsu Chemical Co., Ltd.). By the introduction of a nitrogen gas into the flask with stirring performed for 30 minutes, nitrogen substitution was carried out. Thereafter, the contents of the flask were heated to 60° C. Subsequently, while maintaining the contents in the flask at 60° C., 0.89 parts of 3-mercaptopropylmethyldimethoxysilane (KBM-802, Shin-Etsu Chemical Co., Ltd.) was added. After stirring was performed for 30 minutes, 0.05 parts of azobisisobutyronitrile, a polymerization initiator, was added to initiate the polymerization. Thereafter, 0.5 parts of azobisisobutyronitrile was added every 30 minutes, four times in total. With the passage of 360 minutes from the addition of the polymerization initiator, the mixture was cooled to room temperature. Thereby, a copolymer solution was obtained. The solvent was removed from the copolymer solution with a rotary evaporator to give a copolymer (A1). The copolymer (A1) had a weight average molecular weight (Mw) of 44000 and a number average molecular weight (Mn) of 14000.

In respect of the resulting copolymer (A1), the mixture liquid and the cured product were evaluated according to the evaluation methods described above. The results are shown in Table 1. No metal components were detected.

Example 2 to 4, Comparative Example 1 to 5, 7, 8

Production and Evaluation of Copolymers A2-A3, B1-B5, B7, B8

Copolymerization was carried out in the same manner as in Example 1 except that monomers and a chain transfer agent were changed to compositions shown in Table 1, so that copolymers A2 to A3, B1 to B5, B7, and B8 were obtained. In respect of those copolymers, their mixture liquids and cured products were evaluated in the same manner as in Example 1. The results are included in Table 1.

Comparative Example 6

Production and Evaluation of Copolymer B6

A 1 L pressure-resistant reaction vessel was charged with 80 parts of n-butyl acrylate, 20 parts of ethyl acrylate, 3.07 parts of hydroxyethyl-2-bromopropionate as a hydroxyl group-containing initiator, 2.24 parts of cuprous bromide, 4.87 parts of 2,2'-bipyridyl, 90 parts of ethyl acetate, and 20 parts of acetonitrile. By the introduction of a nitrogen gas with stirring performed for 30 minutes, nitrogen substitution was carried out. Thereafter, the sealed mixture was heated to 130° C. and was reacted for 2 hours. The reaction vessel was returned to room temperature, and 4.06 parts of 2-hydroxyethyl methacrylate was added. The mixture was reacted at 110° C. for 2 hours. The mixture was diluted with 200 parts of ethyl acetate and insoluble matters were filtered off. Thereafter, the filtrate was washed with 10% hydrochloric acid and brine, and the organic layer was dried over sodium sulfate. The solvent was distilled off under reduced pressure to give a copolymer of n-butyl acrylate and ethyl acrylate that had a hydroxyl group at terminals.

Next, to 50 parts of the copolymer of n-butyl acrylate and ethyl acrylate that had a hydroxyl group at terminals and 100 parts of a toluene solution of 10 parts of pyridine, 6.81 parts of undecenoic acid chloride was slowly added dropwise under nitrogen atmosphere at 75° C. The mixture was stirred at 75° C. for 3 hours. The resulting white solid was filtered, the organic layer was washed with diluted hydrochloric acid and brine, and the organic layer was dried over sodium sulfate. Concentration under reduced pressure yielded a copolymer of n-butyl acrylate and ethyl acrylate having an alkenyl group. Subsequently, a 30 mL pressure-resistant reaction vessel was charged with 2 parts of the copolymer of n-butyl acrylate and ethyl acrylate having an alkenyl group at both terminals, 0.32 parts of methyldimethoxysilane, 0.09 parts of methyl orthoformate (3 equivalents with respect to an alkenyl group), and platinum bis(divinyltetramethyldisiloxane) ($8.3 \times 10^{-8}$ mol/L xylene solution, $10^{-4}$ equivalents with respect to an alkenyl group). The mixture was stirred at 100° C. for 1 hour. Volatile components were distilled off under reduced pressure to give a copolymer (B6) of n-butyl acrylate and ethyl acrylate having a crosslinkable silyl group. In respect of the resulting copolymer B6, its mixture and its cured product were evaluated in the same manner as in Example 1. The results are shown in Table 1. As a metal component, 135 ppm of Cu was detected.

TABLE 1

| | | Composition (parts) | | | | Chain transfer agent | | | Number of silyl groups | | | Molecular weight (Mw) ×10⁴ | Molecular weight (Mn) ×10⁴ |
|---|---|---|---|---|---|---|---|---|---|---|---|---|---|
| | Copolymer | BA | 2EHA | EA | LA | KBM-502 | KBM-503 | KBM-802 | Side chain | Terminal | Total | (Mw) ×10⁴ | (Mn) ×10⁴ |
| Example 1 | A1 | 49.43 | 49.43 | | | 1.15 | | 0.89 | 0.7 | 0.7 | 1.4 | 4.4 | 1.4 |
| 2 | A2 | 98.85 | | | | 1.15 | | 0.89 | 0.8 | 0.8 | 1.6 | 4.4 | 1.7 |
| 3 | A3 | 74.14 | | | 24.71 | 1.15 | | 0.89 | 0.8 | 0.8 | 1.7 | 4.0 | 1.7 |
| 4 | A4 | 88.85 | | 10.00 | | 1.15 | | 0.89 | 0.8 | 0.8 | 1.7 | 4.2 | 1.7 |
| Comparative Example 1 | B1 | | 96.30 | | | 3.70 | | 0.50 | 2.8 | 0.5 | 3.4 | 8.8 | 1.9 |
| 2 | B2 | | 98.10 | | | | 1.90 | 1.30 | 0.8 | 0.7 | 1.5 | 3.4 | 1.0 |
| 3 | B3 | | 99.30 | | | | 0.70 | 0.50 | 0.6 | 0.6 | 1.2 | 8.6 | 2.2 |
| 4 | B4 | | 99.35 | | | 0.65 | | 0.50 | 0.5 | 0.5 | 1.0 | 9.8 | 1.9 |
| 5 | B5 | 99.85 | | | | 0.15 | | 0.89 | 0.1 | 0.7 | 0.8 | 4.7 | 1.5 |
| 6 | B6 | 80.00 | | 20.00 | | 1.06 | | — | — | 1.6 | 1.6 | 5.3 | 3.5 |
| 7 | B7 | 88.85 | | 10.00 | | 1.15 | | 2.49 | 0.3 | 0.9 | 1.2 | 1.6 | 0.7 |
| 8 | B8 | 98.85 | | | | 1.15 | | 0.3 | 1.1 | 0.4 | 1.5 | 9.5 | 2.3 |

| | Copolymer | Mw/Mn | Gel fraction (%) | Metal component AA: Present CC: Absent | Viscosity (Pa · s/ 25° C.) | Pot life | Modulus (Hardness JIS-A) | Elongation at break (%) | Residual tack |
|---|---|---|---|---|---|---|---|---|---|
| Example 1 | A1 | 3.14 | 88.8 | CC | 190.0 | AA | 7 | 150 | AA |
| 2 | A2 | 2.59 | 91.7 | CC | 298.0 | AA | 9 | 155 | AA |
| 3 | A3 | 2.35 | 95.3 | CC | 98.0 | AA | 6 | 152 | AA |
| 4 | A4 | 2.47 | 96.1 | CC | 384.0 | AA | 10 | 155 | AA |
| Comparative Example 1 | B1 | 4.63 | 96.0 | CC | >500 | AA | 28 | 60 | AA |
| 2 | B2 | 3.40 | 95.7 | CC | 75.0 | CC | 9.5 | 75 | BB to AA |
| 3 | B3 | 3.91 | 88.2 | CC | 345.0 | CC | 2 | 168 | CC |
| 4 | B4 | 5.16 | 84.0 | CC | 430.0 | AA | <1 | 188 | CC |
| 5 | B5 | 3.13 | 3.7 | CC | 330.0 | AA | Not-cured | Not-cured | Not-cured |
| 6 | B6 | 1.51 | 96.7 | AA | 304.0 | CC | 4 | 213 | AA |
| 7 | B7 | 2.29 | 96.0 | CC | 46.0 | AA | 8 | 45 | AA |
| 8 | B8 | 4.13 | 80.0 | CC | >500 | AA | 4 | 290 | BB |

BA     n-butyl acrylate
2EHA     2-ethylhexyl acrylate
EA     ethyl acrylate
LA     lauryl acrylate
KBM-502     3-methacryloxypropylmethyldimethoxysilane
KBM-503     3-methacryloxypropyltrimethoxysilane
KBM-802     3-mercaptopropylmethyldimethoxysilane The copolymers (A1) to (A4) obtained in Example 1 to 4 all satisfied requirements specified in the present invention: the number of methyldimethoxysilyl groups per one molecule of the polymer, the number of methyldimethoxysilyl groups at molecular side chains per one molecule of the polymer, and the number of methyldimethoxysilyl groups at molecular chain terminals per one molecule of the polymer. The resulting copolymers themselves contained no metal components and had moderate viscosity. The mixture liquids, which were curable compositions, had suitable pot life and were excellent in handleability. Cured products obtained from the mixture liquids had modulus and elongation at break that were well-balanced and were free from stickiness. The results indicate that those copolymers (A1) to (A4) are suitable as sealant components.

It is considered that the copolymer (B1) of Comparative Example 1 had an elongation at break that was poor at not more than 100% because of containing more than 2.5 silyl groups at molecular side chains (side-chain silyl groups). It is considered that the copolymer (B7) of Comparative Example 7 had an elongation to break that was poor because of containing less than 0.5 side-chain silyl groups and having a weight average molecular weight (Mw) of less than 30000. It is considered that the copolymer (B8) of Comparative Example 8 had a residual tack that was somewhat poor because of containing not more than 0.5 silyl groups at molecular chain terminals (terminal silyl groups) and had handleability that was poor because of having an increased viscosity due to heightened molecular weight caused by the chain transfer agent (KBM-802) being added in a small quantity. In respect of the copolymer (B5) of Comparative Example 5, it is considered that the mixture liquid for property evaluation failed to cure because of containing 0.5 or fewer side chain silyl groups with the total amount of crosslinkable silyl groups being less than 1.1 per one molecule of the polymer.

It is considered that the copolymers (B2) and (B3) of Comparative Examples 2 and 3 had poor pot life because the side chain silyl groups were trimethoxysilyl groups.

It is considered that the copolymer (B6) of Comparative Example 6 had poor pot life because of the presence of metal residues in the resin.

It is considered that the copolymer (B4) of Comparative Example 4 had a residual tack that was poor because the total amount of the crosslinkable silyl groups was less than 1.1 per one molecule of the polymer in spite of the fact that both the number of the side chain silyl groups and the number of the terminal silyl groups exceeded 0.5.

INDUSTRIAL APPLICABILITY

The (meth)acrylic acid alkyl ester polymer of the invention has good crosslinkability and thus can be used suitably in applications involving crosslinking and curing. The (meth)acrylic acid alkyl ester polymer and its crosslinked product of the invention may be used in applications including sealants, pressure-sensitive adhesives, bonding agents, vehicles for paints, primer resins, binders for ink, coating resins for covering surfaces of inorganic material such as cement, mortar, metals and glass, sheet articles, film articles, foams, reactive plasticizers, plasticizers, diluents, compatibilizers, polymeric silane coupling agents, silica coating agents, grafting agents and blocking agents for silicone resins, as intermediate raw materials, raw materials for modification resins as e.g., modifiers of silicone rubbers, raw materials for resins or raw materials for modification for various block polymers, as macromers, and additives. Further examples of the applications include fiber modifiers, fiber surface treatment agents, paper processing agents, paper modifying agents, surface active agents, dispersion stabilizers, dispersion mediums, solvents, viscosity regulators, adsorbents, hair processing agents, additives for toners, electric charge controlling agents, antistatic agents, low-shrinkage agents, antifogging agents, antifouling agents, hydrophilizing agents, lipophilicity imparting agents, pharmaceutical carriers, pesticide carriers, cosmetic compounding agents, lubricants, additives for polymer alloys, gel coating agents, resins for FRP, additives for FRP resins, resins for artificial marble, resin additives for artificial marble, resins for injection-molded products, raw materials for UV and EV curable resins, tackifiers, various binders, urethane modifiers for RIM, resins for laminated glass, damping materials, sound-insulating materials, resins for separation membranes, soundproofing materials, sound-absorbing materials, artificial leather, artificial skin, synthetic leather, various industrial parts, daily necessities, articles for toiletry, acrylic silicone rubbers, acrylic silicone rubber modifiers, acrylic silicone foam modifiers, silicone rubber modifiers, silicone foam plasticizers, silicone foam modifiers, and acrylic rubber modifiers.

The invention claimed is:

1. A (meth)acrylic acid alkyl ester polymer that has a weight average molecular weight (Mw) measured by gel permeation chromatography (GPC) method of 30,000 to 150,000 and a number average molecular weight (Mn) of 2500 or more and less than 19,000 and that has 1.1 to 3.0 methyldimethoxysilyl groups, 0.55 to 1.5 methyldimethoxysilyl groups at side chains of a molecular chain, and more than 0.5 methyldimethoxysilyl groups at molecular chain terminals, per one molecule of the polymer.

2. The (meth)acrylic acid alkyl ester polymer according to claim 1, which has a structural unit derived from (meth)acrylic acid alkyl ester in which an alkyl group has 2 to 25 carbons.

3. The (meth)acrylic acid alkyl ester polymer according to claim 1, which has a molecular weight distribution (Mw/Mn) of 1.8 or more.

4. The (meth)acrylic acid alkyl ester polymer according to claim 1, which contains substantially no metal components.

5. The (meth)acrylic acid alkyl ester polymer according to claim 1, which has no crosslinkable silyl groups other than methyldimethoxysilyl groups.

6. A sealant comprising the (meth)acrylic acid alkyl ester polymer described in claim 1.

7. The (meth)acrylic acid alkyl ester polymer according to claim 2, which has a molecular weight distribution (Mw/Mn) of 1.8 or more.

8. The (meth)acrylic acid alkyl ester polymer according to claim 2, which contains substantially no metal components.

9. The (meth)acrylic acid alkyl ester polymer according to claim 3, which contains substantially no metal components.

10. The (meth)acrylic acid alkyl ester polymer according to claim 2, which has no crosslinkable silyl groups other than methyldimethoxysilyl groups.

11. The (meth)acrylic acid alkyl ester polymer according to claim 3, which has no crosslinkable silyl groups other than methyldimethoxysilyl groups.

12. The (meth)acrylic acid alkyl ester polymer according to claim 4, which has no crosslinkable silyl groups other than methyldimethoxysilyl groups.

13. A sealant comprising the (meth)acrylic acid alkyl ester polymer described in claim 2.

14. A sealant comprising the (meth)acrylic acid alkyl ester polymer described in claim 3.

15. A sealant comprising the (meth)acrylic acid alkyl ester polymer described in claim 4.

16. A sealant comprising the (meth)acrylic acid alkyl ester polymer described in claim 5.

* * * * *